March 1, 1966 D. B. CACHELIN ETAL 3,238,381

SHIFT REGISTER EMPLOYING RESONANT CIRCUIT BETWEEN STAGES AND CLOCK PULSE TO EFFECT SHIFTING

Filed April 8, 1963

INVENTORS:
Donald B. Cachelin
Harold Marchant
By Smyth, Roston & Pavitt
Attorney United States Patent Office 3,238,381

Patented Mar. 1, 1966

3,238,381

SHIFT REGISTER EMPLOYING RESONANT CIRCUIT BETWEEN STAGES AND CLOCK PULSE TO EFFECT SHIFTING

Donald B. Cachelin, West Los Angeles, and Harold Marchant, Santa Monica, Calif., assignors to Scientific Data Systems, Inc., Santa Monica, Calif., a corporation of Delaware Filed Apr. 8, 1963, Ser. No. 271,213
7 Claims. (Cl. 307—88.5)

Figures 1, 2:
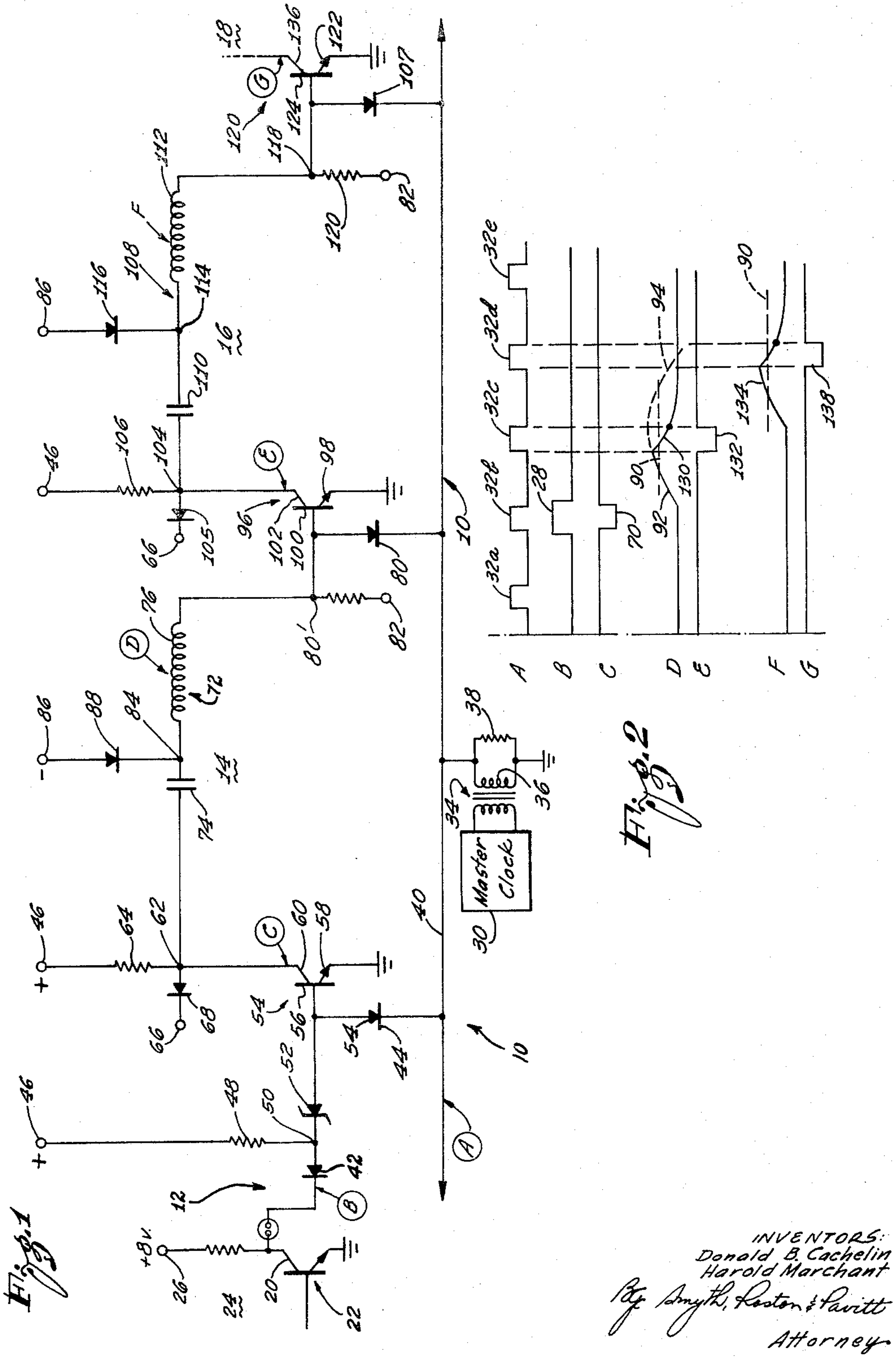

The present invention relates to shift registers and more particularly to a new and improved shift register which is more reliable and faster.

In the computer and related arts, signals are employed that consist of a series of binary pulses which occur at a predetermined clock rate. It is frequently desirable to shift or delay the signal by some interval of time that is equal to an integral number of clock pulses. In order to accomplish this, it is customary to employ a shift register that is effective to delay the binary pulses by a predetermined number of clock pulses. Heretofore, there have been several different forms of shift registers available for shifting or time delaying a series of binary pulses.

In one form of shift register, a plurality of switching devices such as vacuum tubes or transistors, are arranged to form a series of so-called flip-flop circuits. In such a circuit, one side thereof is conductive while the other side is non-conductive, and the two sides may be made to reverse their conductive states in synchronism with a clock pulse. In order to form a shift register, each stage of the register is a separate flip-flop circuit that is responsive to the state of the preceding flip-flop circuit and to the clock pulses. Each time a clock pulse occurs, each flip-flop circuit is effective to assume the state of the preceding flip-flop circuit in the series. As a consequence, a binary pulse introduced into the first flip-flop circuit in the series will be propagated from one stage to the next stage at the same rate as the clock rate. Although such shift registers are effective to time delay or shift binary pulses, they require a large number of components and as a result are not only expensive but are subject to a substantial probability of a failure due to malfunction of one or more components.

In another form of shift register, a plurality of magnetic devices capable of being magnetized between alternate polarities are interconnected in a series. Each of the magnetic devices is responsive to a clock pulse and to the polarity of the preceding magnetic device. Upon the occurrence of a clock pulse, each device will assume a magnetic state having a polarity corresponding to that of the preceding device. Thus, a pulse fed into the first magnetic device in the series will be effectively propagated through the entire series. Although this is an effective form of shift register, the maximum frequency at which it can operate is severely limited due to the inherent characteristics of the magnetic material and the switching circuits associated therewith.

In another form of shift register, a delay line is provided through which the pulses may be propagated. Due to the characteristics of the delay line, the time required for a pulse to propagate through the line from one end to the other end will be equal to a predetermined number of clock pulses. As a consequence, the pulses fed into the delay line will be delayed or shifted by the desired amount. This is an effective form of shift register or delay means. However, the amount of delay is a function of the length of the line and cannot be varied as a function of the clock frequency. In addition, such lines are normally very sensitive to the various factors such as temperature, etc. As a consequence, if one or more of the characteristics produces a variation in the amount of delay or if the clock frequency varies, the amount of shift or delay becomes in error. Therefore, delay lines must be manufactured and operated within very close tolerances or the entire line will fail to operate properly.

It is now proposed to provide a shift register or delay means which will overcome the foregoing difficulties. More particularly, it is proposed to provide a shift register which is capable of shifting or time delaying the pulse in binary signals at a very high rate of speed with a high degree of reliability. In addition, the shift register employs a minimum number of components so as to be simple and inexpensive to manufacture and is capable of operating accurately over a wide range of operating characteristics. More particularly, in one operative embodiment, this is accomplished by providing a shift register having a plurality of stages wherein each stage includes a reactive circuit which is responsive to an input pulse and will be effective to create a subsequent signal at a period of time substantially coincident with the succeeding clock pulse. This signal in combination with the subsequent clock pulse will actuate a succeeding stage and thereby cause the input pulses to be propagated through the successive stages of the shift register.

These and other features and advantages of the present invention will become readily apparent from studying the following detailed description of one embodiment thereof, particularly when taken in connection with the accompanying drawings, wherein like reference numerals refer to like parts, and wherein:

FIGURE 1 is a schematic diagram of a shift register embodying one form of the present invention; and FIGURE 2 is a series of waveforms which are present in the various portions of the shift register of FIGURE 1.

Referring to the drawings in more detail, the present invention is particularly adapted to be embodied in a shift register 10 for use with any type of equipment wherein it is desired to shift or time delay a series of pulses forming binary signals. The shift register 10 may have an input section 12 for being coupled to the output of a stage in a computer or similar devices and a plurality of substantially identical stages for shifting or delaying the input pulse signals by preselected intervals. Although any desired number of stages may be employed, for purposes of simplicity, only two complete stages 14 and 16 and the beginning of a third stage 18 are disclosed herein.

The input section 12 may be connected to any desired source of binary signals. By way of example, it may be connected to the collector 20 of a transistor 22 forming one-half of a conventional flip-flop circuit 24. Normally, this transistor 22 will be biased to maintain the collector 20 in a conductive state. Thus, the potential of the collector 20 will be maintained at substantially ground level. When a binary pulse is to occur, the transistor 22 will be momentarily biased so as to switch the transistor 22 "OFF" and cause the collector 20 to become nonconductive. This will cause the potential on the collector 20 to rise toward the potential of a supply source 26 energizing the collector 20. The signal present on the collector 20 will thus be similar to FIGURE 2B and will have reference level at ground potential and a positive-going pulse 28 of predetermined time duration that will constitute the binary signal that is to be time delayed or shifted.

Normally, it is desirable for the binary pulses to occur at predetermined time intervals so as to be inter-related with each other in some suitable timed relationship. To accomplish this, a master clock 30 may be provided that will produce a series of constant frequency clock pulses 32 such as shown in FIGURE 2A. The clock 30 may be of any conventional variety that is adapted to run at a predetermined fixed frequency and produce a series of substantially identical squarewave clock pulses 32. By way of example, the clock 30 may produce clock pulses 32 having a frequency on the order of 3 megacycles or having a period on the order of about 0.33 microsecond. The duration of the clock pulses 32 may be on the order of 0.11 microsecond with about a 0.22 microsecond interval therebetween.

The output of the master clock 30 may be interconnected with a primary of a coupling transformer 34. The transformer 34 may include a secondary 36 that is inductively coupled to the primary so as to have the clock pulses induced therein. A resistor 38 may be connected across the secondary 36 and have one end connected to ground and the other end connected to a clock pulse line 40 so that the clock pulses will be transferred onto the clock pulse line 40.

The clock line 40 may have a portion thereof interconnected with the preceding equipment such as the flip-flop 24. This will synchronize the operation of the flip-flop 24 so that the transistor 22 will be switched "ON" and "OFF" in synchronism with the clock pulses 32. As may be seen from FIGURES 2A and 2B, the pulses 28 formed on the collector 20 will at least partially overlap the clock pulses 32. In addition, the clock pulse line 40 may be interconnected with the various stages 14, 16 and 18 of the shift register 10. This will insure all of the equipments including the various stages of the shift register 10 working in synchronism with each other and at a frequency which is controlled by the frequency of the master clock 30.

The input section 12 of the shift register 10 includes a pair of diodes 42 and 44 that may be arranged to form an "AND" gate. More particularly, the first diode 42 may be connected to a source 46. The magnitude of this potential may be of any desired magnitude and will depend upon the various parameters of the components employed. However, by way of example, this source may be effective to provide a D.C. potential of approximately 25 volts positive. The diode 42 is also connected directly to the collector 22 of the output transistor 22 in the flip-flop 24. The second diode 44 is connected between the base 56 of a transistor 54 and ground.

As previously stated, the transistor 22 in the flip-flop 24 will normally be conductive and, accordingly, the junction 50 will be clamped to ground potential because of the current flowing from the source 46 and resistor 48 through the diode 42 and transistor 22 to ground. However, when a binary signal pulse occurs, the transistor 22 will be cut off so that no current will flow through the collector 20 and the potential of the collector 20 will rise toward the potential of the source 26 for the duration of the pulse.

In the event there is no clock pulse on the clock line, the diode 44 will be effective to clamp the junction 50 to ground level. However, if there is a clock pulse 32 present on the line 40, the potential of the line 40 will be positive by an amount equal to the amplitude of the clock pulse 32. This positive potential will persist only for the duration of the clock pulse 32. In the absence of a binary pulse from the collector 20, the diode 44 will block a positive swing of the potential at the junction 50. However, if there is a simultaneous occurrence of a clock pulse 32 and the binary pulse 28, the potential at the plate 54 of the diode 44 will rise to the positive potential present on the clock line 40 for the duration of the clock pulse 32. It will thus be seen that the input section 12 will be effective to form an "AND" gate and the potential at the plate 54 of the diode 44 will be effective to indicate the simultaneous occurrence of a clock pulse 32 and a binary signal pulse 28.

In order to prevent the presence of "noise" creating a false indication of such an occurrence, a Zener diode 52 may be disposed between the plate 54 of the diode 44 and the junction 50. The Zener level of this diode 52 may be set above the normal "noise" level but below the potential of the pulses 28 which will be produced on the collector 20. Thus, "noise" signals will be incapable of producing fluctuations in the potential at the plate 54 of the diode 44 unless the potential at the junction 50 exceeds the Zener level of the Zener diode.

The first or input stage 14 of the shift register 10 includes a semiconductive device such as a transistor 54 having a base 56, an emitter 58 and a collector 60. The emitter 58 is connected directly to ground while the base 56 is connected directly to the plate 54 of the diode 44 and the Zener diode 52. The collector 60 is connected to a high voltage source 46 by means of a dropping resistor 64. This source 46 may be the same as the source 46 employed with the input section. In addition, the collector 60 may be connected to a junction 62 that leads to a low voltage source 66 by means of a blocking diode 68. The potential of this source may be any amount that is compatible with the remaining elements in the circuit and by way of example it may be on the order of 8 volts positive.

Normally, the base 56 will be maintained at ground potential by the diode 44. As a consequence, the collector 60 will be maintained non-conductive. This, in turn, will result in the potential of the collector 60 being substantially equal to the potential established by the low voltage source 66. However, when the potential at the base 56 rises to the same potential as the peak of the clock pulses 32, the collector 60 will become conductive. This will result in little, if any, resistance to the flow of current from the junction 62 through the collector 60 to ground. This, in turn, will cause the collector potential to drop to substantially ground level.

It may thus be seen that normally current will flow from the source 46, through diode 42, into the transistor 22 to ground so as to maintain the junction 50 at ground or reference level. However, upon the simultaneous occurrence of a clock pulse 32 and a binary pulse 28, the current will no longer flow from the source 46 through the transistor 22. Instead, it will flow through the Zener diode 52 and the transistor 54 to ground, thereby making the collector 60 conductive for the duration of the clock pulse. As may be seen from FIGURES 2A, 2B and 2C, the simultaneous occurrence of a clock pulse 32 and a binary pulse 28 will cause a negative going pulse 70 to appear on the collector 60. This pulse 70 will inherently be coincident with the clock pulse 32 both as to time and duration. At all other times, the collector 60 will be maintained at the potential of the low voltage source 66.

The collector 60 and junction 62 are also interconnected with one end of an impedance circuit 72 having a condenser 74 which forms a capacitive reactance and an inductor 76 which forms an inductive reactance. The opposite end 80′ of this impedance circuit 72 may be interconnected with the clock pulse line 40 by means of a diode 80. In addition, this end 80′ of the circuit 72 may be interconnected with a source 82 of negative potential. This source 82 may have any desired potential compatible with the various components but by way of example it may be the negative equivalent of the first source or a negative 25 volts. At the same time, the mid-point 84 between the condenser 74 and inductance 76 may be interconnected with another source 86 by means of a clocking diode 88. The potential of this source 86 must, of course, be compatible with the various components but, by way of example, it may be on the order of a negative 3 volts.

Normally, the collector 60 will be non-conductive and at the potential of the low voltage source. At the same time, by a proper proportioning of the various values and because of the clamping action of the diode 80, the mid-point 84 in the impedance circuit 72 may be maintained at substantially the potential of the ground line or ground level. As a consequence, the condenser 74 will normally acquire a charge having a potential that is substantially equal to the potential of the low voltage source 66. The current in the inductance 76 is shown in FIGURE 2D, As may be seen when the condenser 74 is charged, the current in the inductance 76 will be substantially zero.

When the collector 60 becomes conductive, the potential thereof will be immediately clamped to ground. This will create a potential difference that will cause the condenser 74 to discharge through the collector 60 and to ground. Since there will be very little, if any, resistance in this discharge path, the condenser 74 will be substantially completely discharged while the collector 60 is conductive. i.e., within the interval of a clock pulse 32. However, as soon as the clock pulse 32 terminates, the collector 60 will again be cut off and rise to the potential of the source 66. This will result in a surge of current 92 through the inductor 76 while the condenser 74 is recharging. As may be seen from FIGURE 2D, this surge of current 92 will begin to build up from substantially zero toward a maximum level. Since the condenser 74 and inductor 76 will tend to act as a series resonant circuit, this current will follow a generally sinusoidal pattern. The condenser 74 and inductor 76 will inherently form a series resonant circuit. The capacitive reactance and inductive reactance are preferably chosen so that the circuit 72 will have a predetermnied resonant frequency. This frequency may vary over a wide range but it should be such that the current flow will reach its maximum value or at least a magnitude capable of switching a transistor during the next succeeding clock pulse. As a consequence, following the discharge of the condenser 74, the current flow in the inductor 76 will rise from zero to approximately its peak value or a transistor switching magnitude 90 in an interval of time that is approximately equal to the interval of time between the successive clock pulses.

When a clock pulse 32 occurs during a current surge 92, the potential of the clock line 40 will swing positive and disrupt the flow of this current by diverting it into the second stage 16. This disruption of current will cause a dissipation of the energy in the impedance circuit. As may be seen in FIGURE 2D, at the commencement of a clock pulse the current in the inductor will not follow a sinusoidal pattern as indicated by the dotted line 94. Instead, during the clock pulse 32, the current will be rapidly reduced. This will be effective to reduce the current flow to a level that will prevent the "ringing" of the impedance for an extended period of time.

The second stage 16 may be substantially identical to the first stage 14. It includes a transistor 96 having its emitter 98 connected directly to ground and the base 100 connected to the junction between the end 80′ of the impedance circuit 72 and the diode 80. The collector 102 is connected to the low voltage source 66 by means of a blocking diode 105 and the high voltage source 46 by means of a current limiting resistor 106. A second impedance circuit 108 may extend from a junction 104 at the collector 102 and be connected to the clock line 40 by means of a diode 107. This impedance circuit 108 may include a condenser 110 and inductance 112 which are substantially identical to those in the first impedance circuit 72 so that the two circuits 72 and 108 will have similar characteristics. The mid-point 114 in the circuit 108 between the capacitance 110 and inductance 112 may be interconnected with the low voltage source 86 by means of a clocking diode 116 while the end 118 of the circuit 108 is connected to the negative source 82 by means of a limiting resistor 120.

In the event one or more additional stages are employed, they may be substantially identical to the preceding stages and employ transistors 120 with the emitters 122 connected to ground and the bases 124 connected to the junction between the end 118 of the impedance circuit 108 and the diode 107. If it is desired to employ the stage 16 as the terminal stage, the end 118 may be connected to any desired load.

In order to utilize the present shift register 10 for shifting binary signals, the input section 12 may be connected to a source of the binary signals such as the flip-flop 24 so that the binary signals will occur substantially coincident with the clock pulses. As may be seen from FIGURES 2A and 2B, in the event a clock pulse, such as pulse 32, occurs without the simultaneous occurrence of a binary signal pulse 28, the potential on the collector 60 will remain at ground level. As a consequence, all of the successive stages of the shift register will be unaffected at the time of the clock pulse 32*a*. However, if on the succeeding lock pulse 32*b* a binary pulse 28 occurs simultaneously therewith, the collector 60 will be switched to a conductive state. As seen in FIGURE 2C, the collector 60 will be clamped to ground level for the duration of the clock pulse so as to form the pulse 70. This will cause the condenser 74 to immediately discharge. Upon the termination of the clock pulse 32, the collector 60 will instantly rise to the potential of the source 66, thereby permitting the condenser 74 to acquire a new charge. During this charging process, a current will instantly start to flow through the inductor 76. As may be seen in FIGURE 2D, the current surge 92 will follow a generally sinusoidal pattern and increase from zero toward a maximum value. In the event there are no disturbing effects upon this circuit, the current would then sinusoidally decrease accordingly to the line 94 so that the currents and voltages in the capacitive and inductive reactances would tend to oscillate between each other and produce a "ringing" within the circuit 72. However, at approximately the same time that the current in the inductive reactance 76 reaches its maximum value or at least exceed the current switching level 90, a clock pulse 32*c* will occur on the clock line 40. This clock pulse 32*c* will be coupled through the diode 80 and produce a corresponding rise in the potential of the base 100 of the transistor 96. As a consequence, the current from the inductor 76 will flow through the base-emitter circuit of the transistor 96. This will cause a substantial portion of the energy previously in the impedance circuit to be dissipated within the transistor 96. As a result, during the existence of the clock pulse, the current flow in the inductive reactance will experience a discontinuity 130 and very rapidly decrease to such a level that the circuit 72 will be incapable of materially "ringing" after the termination of the clock pulse 32*c*.

During the interval of the clock pulse 32*c*, and while the current is flowing through the base-emitter circuit of transistor 96, the collector 102 will be conductive. The collector will thus cause the junction 104 to be clamped immediately to ground so as to discharge the condenser 110. Following the termination of the clock pulse 32*c*, the collector 102 will again rise to the potential of the low voltage source 66. Thus, a pulse 132 will be formed on the collector 102. This pulse 132 will cause the condenser 110 to discharge. Following pulse 132, a surge 134 of charging current will flow through the inductor 112. This current will then build up to its maximum value substantially coincident with the occurrence of the succeeding clock pulse 32*d*. This will raise the potential of the diode 107 and cause the current 134 to be diverted through the base-emitter circuit of the transistor 120. This, in turn, will thus switch the collector 136 ON during the existence of the clock pulse 32*d*. This, in turn, will produce a pulse 138 on the collector 136.

It may thus be seen from FIGURE 2 that if there is no binary pulse 70, no charges will occur in the various stages of the shift register 10. However, in the event a binary pulse 28 is applied to the input of the shift register 10 substantially coincident with a clock pulse 32*b*, a corresponding pulse 70 will be produced at the collector 60 coincident with the clock pulse 32*b*. On the succeeding clock pulses 32, a corresponding pulse 132 or 138 will be created on the collectors 102 or 136. However, as these pulses progress through the various stages, the timing thereof will be controlled by the clock pulses 32. It should be noted that it is not necessary for the clock 30 and impedance circuits 72 and 108 to be exactly tuned to each other as it is not necessary for the current to reach its maximum value during the clock pulse. Instead, it is merely necessary for the current flow to exceed a level such as 90 that is capable of switching the succeeding transistor. Accordingly, substantial variations may be tolerated in the clock frequency and the characteristics of the impedance circuits 72 and 108. For example, in one operative circuit designed to operate at approximately 3 megacycles, it was found that the clock frequency could vary through a range of approximately 2.6 to 3.7 megacycles without any material alteration in the operating characteristics of the shift register.

While only a single embodiment of the present invention is disclosed, it will be readily apparent to persons skilled in the art that numerous changes and modifications may be made thereto without departing from the spirit of the invention. Accordingly, the foregoing disclosure including the drawings and description thereof are for illustrative purposes only and do not limit the scope of the invention which is defined only by the claims that follow.

What is claimed is:

1. In combination in a shift register for delaying input signals,
- means for providing the input signals,
- switching means having a first state and a second state,
- a source of clock pulses occurring at periodic intervals corresponding to the intervals by which said input signals are delayed,
- means operatively coupled to the switching means for biasing the switching means to the first state,
- resonant means interconnecting said switching means with said input means and said source of clock pulses for producing a discharge current at the resonant frequency in response to the simultaneous occurrence of one of said clock pulses and said input signals and for producing a charging current after the occurrence of said clock pulse,
- means operatively interconnected with said switching means and responsive to the next occurrence of one of the clock pulses after the production of the charging current to obtain an operation of the switching means in the second state, and
- means responsive to the operation of the switching means in the second state for producing an output signal.

2. In combination in a shift register for delaying input signals by a particular period of time:
- input means for providing said input signals,
- switching means having a first state and a second state,
- means for biasing the switching means to the first state,
- clock means effective to generate a series of clock pulses separated in time from one another by said particular period,
- resonant means including a capacitor and an inductor in series and interconnected with said switching means and with said input means and said clock means for producing a discharge of the capacitor during the coexistence of one of said input pulses and one of said clock pulses and for producing a charge of the capacitor after the occurrence of said one of said clock pulses and at a resonant frequency related to the frequency of said clock pulses,
- means operatively interconnected with said switching means and responsive to said charge of said capacitor for obtaining an operation of the switching means in the second state upon the occurrence of the next clock pulse, and
- means responsive to the operation of the switching means in the second state for producing an output pulse.

3. In combination in a shift register for delaying input signals by a particular period of time:
- first switching means having a first state and a second state,
- input means for providing said input signals,
- clock means effective to produce a sequence of clock pulses separated from one another by substantially said particular period of time,
- second switching means having a first state and a second state,
- means operatively coupled to the first and second switching means for biasing the first and second switching means to the first state,
- resonant means having a resonant frequency approaching the periodic occurrence of the clock pulses and operatively interconnected with said first switching means and said clock means and having characteristics for storing energy, said resonant means being responsive to the operation of said first switching means in the second state for obtaining a discharge of the energy stored in said resonant means during the simultaneous occurrence of one of the clock pulses and for obtaining a subsequent storage of energy in said resonant means during the period between the discharge of the stored energy and the subsequent one of the clock pulses,
- means operatively interconnected with the first switching means and the input means and the clock means for obtaining an operation of the first switching means in the second state upon the simultaneous occurrence of one of the input signals and one of the clock pulses,
- control means operatively interconnected with said second switching means and said resonant means and said clock means for obtaining an operation of the second switching means in the second state upon the subsequent storage of energy in the resonant means and the coincident occurrence of one of the clock pulses, and
- means responsive to the operation of the second switching means in the second state for producing an output pulse.

4. In combination in a shift register for delaying input signals by a particular period of time:
- first switching means having a first state and a second state,
- second switching means having a first state and a second state,
- means operatively connected to the first and second switching means for biasing the first and second switching means to the first state,
- input means for providing said input signals,
- clock means effective to produce a sequence of clock pulses having a period equal to the particular period,
- each of said first and second switching means being operative to the second state upon the introduction of a particular voltage to that switching means,
- control means operatively interconnected with said first switching means and said clock means for introducing the particular voltage to the first switching means to switch said first switching means from the first state to the second state during the coexistence of one of the clock pulses and one of the input signals,
- a resonant circuit having a capacitor and an inductance for accumulating a charge and having a first path including the capacitor and the inductance for increasing the charge on said capacitor from a first level to a second level corresponding to the particular voltage and having a second path including the capacitor for changing the charge on said capacitor from said second level back to said first level, the second one of said paths being operatively interconnected with said first switching means and having a time constant for changing the charge to said first level from said second level during the operation of said first switching means in said second state, the first path having a time constant for changing the charge to said second level from said first level during the interval between successive ones of said clock pulses, means operatively coupled to the resonant circuit and to the second switching means for introducing the charge in the resonant circuit to the second switching means to obtain an operation of the second switching means in the second state upon the occurrence of the second charge in the resonant circuit, and means responsive to the production of the second state in the second switching mens for producing an output pulse.

5. In combination in a shift register for delaying input signals by a particular period of time:

input means for providing said input signal, first switching means having a first state and a second state, second switching means having a first state and a second state, means operatively coupled to the first and second switching means for biasing the first and second switching means to the first state, clock means for producing a sequence of clock pulses at periods corresponding to the particular period, an AND gate having a first input connected to said clock means to receive said clock pulses and a second input connected to said input means to receive said input signal, said gate having an output interconnected with said first switching means to switch said first switching means from the first state to the second state during the coexistence of one of the clock pulses and one of the input signals, a series resonant circuit having an inductance and a capacitance and having the capacitance interconnected with said first switching means and responsive to the operation of the first switching means in the second state to discharge the capacitance through the first switching means during the operation of the first switching means in the second state, the series resonant circuit being resonant at a frequency related to the frequency of the clock pulses, means responsive to the discharge of the capacitance and to the operation of the second switching means in the first state for obtaining a particular charge of the capacitance before the occurrence of the next one of the clock pulses, control means responsive to the next occurrence of one of the clock pulses and to the particular charge of the capacitance for obtaining an operation of the second switching means in the second state, and output means responsive to the operation of the second switching means in the second state for producing an output pulse.

6. In the shift register set forth in claim 5, the first and second switching means constituting semi-conductors each having a base, an emitter and a semi-conductor, the biasing means being connected between the base and emitter of each of the semi-conductors, the output means being connected to the collector of the second semi-conductor, the output of the AND gate being connected to introduce a signal between the base and emitter of the first semi-conductor, and the control means being connected to introduce a signal between the base and emitter of the second semi-conductor.

7. In the shift register set forth in claim 3, the first and second switching means constituting semi-conductors.

References Cited by the Examiner

UNITED STATES PATENTS

| | | | |
|---|---|---|---|
| 2,594,336 | 4/1952 | Mow | 307—88.5 |
| 2,614,141 | 10/1952 | Edson et al. | 307—88.5 |
| 3,046,531 | 7/1962 | Armata | 307—88.5 |

ARTHUR GAUSS, *Primary Examiner.*